R. G. KANN.
METHOD OF MANUFACTURING GLASS.
APPLICATION FILED AUG. 17, 1912.
1,149,451.
Patented Aug. 10, 1915.
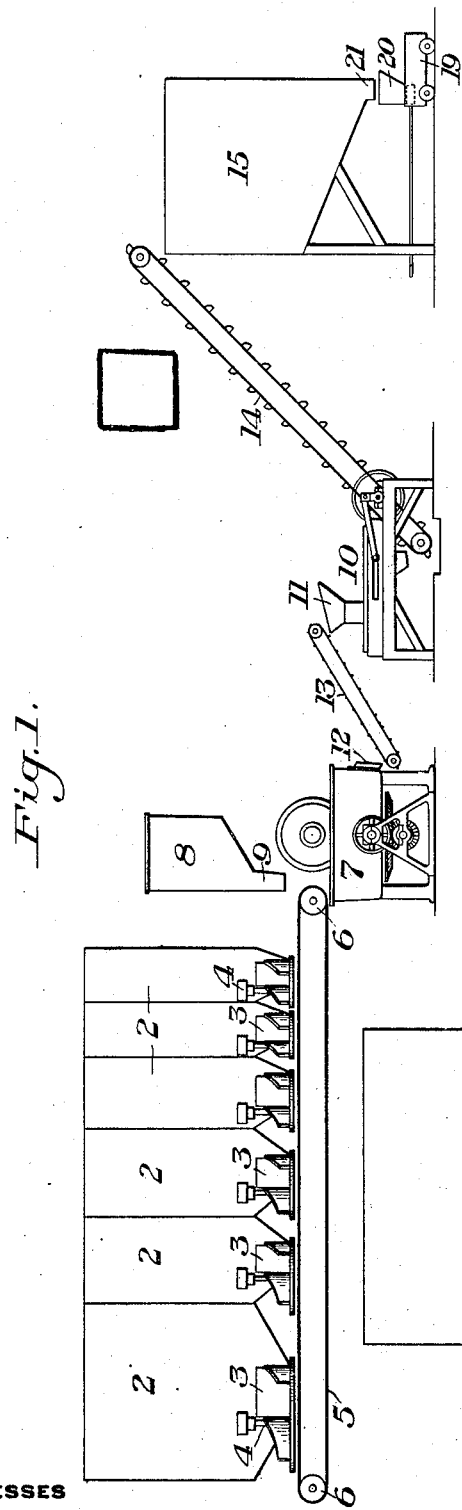
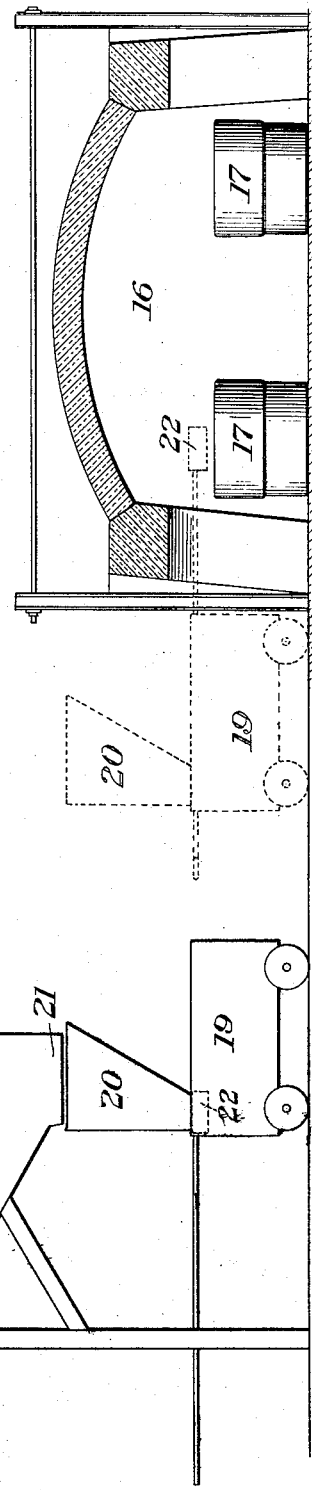
WITNESSES
R A Balderson
P M Conway
INVENTOR
R. G. Kann,
by Bakewell, Byrnes & Parmelee,
Attys.

UNITED STATES PATENT OFFICE.

RALPH G. KANN, OF PITTSBURGH, PENNSYLVANIA.

METHOD OF MANUFACTURING GLASS.

1,149,451.

Specification of Letters Patent.

Patented Aug. 10, 1915.

Application filed August 17, 1912. Serial No. 715,662.

*To all whom it may concern:*

Be it known that I, RALPH G. KANN, a resident of Pittsburgh, in the county of Allegheny and State of Pennsylvania, have invented a new and useful Method of Manufacturing Glass, of which the following is a full, clear, and exact description, reference being had to the accompanying drawings, forming part of this specification, in which—

Figure 1 is a side elevation which diagrammatically shows one form of apparatus for carrying out my invention; and Fig. 2 is a side elevation partially in section, showing one form of apparatus for charging the pots in a glass melting furnace.

My invention relates to the manufacture of glass, and is designed to provide a novel method of preparing and forming the charges or batches for the melting pots or tanks.

In the manufacture of glass, as is well known, it is necessary for any particular quality of glass to mix the various batch forming ingredients in accordance with a predetermined formula; and in order to obtain finished glass of the character and quality desired, it is necessary that the molten glass shall contain the required elements combined in substantially the right quantities, especially as to many of the batch elements. This result is not obtained in the existing practice for many reasons. It is customary to mix the batch forming ingredients in bulk and to take the individual charges from this mixed mass as they are required. Although the proper proportions of the various ingredients may be initially combined in this mass, the individual charges or batches as well as the molten glass resulting therefrom will, in a large percentage of cases, will not be of the proper character. The batch forming elements are of widely varying degrees of specific gravity, and when mixed in bulk segregation or separation into strata rapidly occurs, so that charges taken from different portions of the mass are not of the same content. Furthermore, the charged materials are held confined in these unit masses so that there is no segregation of portions thereof of different specific gravities while being handled; but on the contrary the particles are held properly intermingled until the unit masses are subjected to sufficient heat to break up the binder and break up the chemical combination of the batch ingredients. The introduction of the charge into the melting pots or furnaces in this manner also results in there being more or less interstices or spaces between adjacent unit masses, providing a path for the circulation of the heat, so that each unit mass is more or less completely enveloped by the heating medium. This, of course, effects a much better distribution of the heat and produces a more uniform chemical reaction throughout the entire charge and which results in greatly reducing the time required to melt the batch, as well as the labor involved, and the saving of a very large percentage of fuel. Furthermore, there is a loss of some of the ingredients in handling and conveying them to the melting pots or tanks; and when introduced into the furnace some of the lighter materials are carried off by the draft and are lodged in the flues or regenerator passages of the furnaces. This takes place to such an extent as to not only seriously affect the composition of the batch, but also results in the choking up of the furnace passages and flues, necessitating frequent shut-downs for cleaning out. For these and other reasons the contents of different pots varies to such an extent that it is frequently necessary during the melting operation to attempt to correct the composition of a particular pot by the addition of more of certain ingredients thereto. This practice is, however, only partially successful, because of the difficulty of determining just the proper amount or amounts of correction which should be introduced into the pot in any particular case; and also because of the fact that in introducing these materials into the pots there is considerable loss, the fine materials being carried away by the furnace draft.

The object of my invention is to provide a method of preparing and forming the batches or charges by means of which a melt of substantially the exact predetermined composition can be obtained in all cases. By the practice of my improved method it is possible in each case to secure glass of substantially the exact predetermined composition; and this can be done largely without the addition of correcting material to the pots. My invention also greatly simplifies the handling of the batch material; the amount of labor required in handling the material and taking care of the melting furnaces, and, of course, largely eliminates imperfect glass.

In accordance with my invention, the batch forming material is divided into separate unit masses, each unit mass containing either a definite quantity of a number of batch forming elements combined in the right proportions for the particular glass to be manufactured, or a definite quantity of a single batch forming element. These unit masses are of such character as to confine therein the material or materials which they contain without loss in handling. Each batch or charge is then made up by using the proper number of these definite unit masses. In this manner each charge necessarily contains the proper ingredients mixed in predetermined proportions and the difficulties above mentioned are entirely obviated.

Preferably the unit masses above referred to are in the form of briquets, and I will now describe a suitable method and apparatus by means of which such briquets may be formed.

Referring to the drawings, the numeral 2 designates the various storage bins containing the raw material, and 3 the outlets therefrom leading to a measuring or proportioning device 4, which may be of any well-known construction, each of which is preferably made adjustable, so as to feed the proper amount of raw material from the bins 2 to a conveyer belt 5, immediately below them. This conveyer belt is mounted on rollers 6, and is adapted to discharge the material into a mixer 7, of any well-known construction. Mounted above the mixer 7, is a container 8, for a suitable binder said container having a downwardly extending spout 9, and through which the binder is fed to the raw material in the mixer as it is deposited from the conveyer 5.

Placed at a suitable point beyond the mixing machine is a continuously operated briqueting machine, which is provided with a hopper 11. Leading outwardly from the mixing machine 7 is a chute 12, and 13 is an endless chain for conveying the mixed batch from the mixer 7 to the hopper 11 of the briqueting machine 10.

14 is an endless conveyer leading from the outlet of the briqueting machine to a storage bin 15 for the compressed briquets or cakes.

16 is a glass furnace in which I have shown a plurality of melting pots 17.

19 is a charging truck, which is provided with a hopper 20, and is adapted to be moved below the outlet 21 of the storage bin 15 and the hopper 20 thereof is filled with compressed briquets or cakes. The truck is then moved to a point adjacent to the furnace in which the pots are to be filled. Slidably mounted on the truck 19 is a charging ladle 22, which is adapted to be moved under the hopper 20 and is automatically filled; the ladle is then pushed forward into the furnace and over the pot 17, which is to be filled. The ladle is then rotated to dump the contents into the pot 17 and is then returned to its normal position and drawn rearwardly under the hopper 20, to be recharged, and the operation is then repeated until the pot has been filled.

The advantages of my invention result from the method of handling a glass batch automatically from the storage bins for the raw material to the charging machine and in which all of the work is done automatically by machines, and in which each cake of the batch contains its proper proportion of the ingredients from which the batch is formed.

By the use of the foregoing method, I overcome the loss of any of the material which is of light specific gravity, and thereby improve the quality of glass, and at the same time increase the lift of the furnace, as all of the material which is charged into the furnace is fused. A further advantage results from the provision of a method in which the various elements of the batch are equally distributed throughout the melting pot or furnace in which the batch is to be melted, so that the batch will be melted down in a shorter time than when placed in the pot furnace in granular form, as the spaces between the briquets will permit the heat from the furnace to attack each of the briquets. A further advantage results from the elimination of all hand labor in handling the batch which is to be charged, which is a large item in the cost of manufacturing glass.

It will readily be understood by those familiar with the art that the batch can be charged into any type of melting receptacle, and that it can be charged therein by any charging apparatus.

I claim:—

In the manufacture of glass, the method of preparing and introducing batch material into glass melting receptacles, which consists in forming the batch material into separate self-sustaining unit masses each of which has a definite predetermined content of batch material therein and in which the material is confined against loss and segregation in handling, and making up each batch from a plurality of superimposed unit masses introduced into the receptacle in their unit mass form and retained in such form until attacked by the heat of the furnace pot or tank; substantially as described.

In testimony whereof, I have hereunto set my hand.

RALPH G. KANN.

Witnesses:
 GEO. B. BLEMING,
 JESSE B. HELLER.